(12) United States Patent
Kamio et al.

(10) Patent No.: US 11,708,896 B2
(45) Date of Patent: Jul. 25, 2023

(54) SHIFT RANGE CONTROL DEVICE

(71) Applicants: DENSO CORPORATION, Kariya (JP); HONDA MOTOR CO., LTD., Tokyo (JP)

(72) Inventors: Shigeru Kamio, Kariya (JP); Masahiko Akiyama, Tokyo (JP); Masashi Misawa, Tokyo (JP); Kenshi Masuo, Tokyo (JP)

(73) Assignees: DENSO CORPORATION, Kariya (JP); HONDA MOTOR CO., LTD., Tokyo (JP)

( * ) Notice: Subject to any disclaimer, the term of this patent is extended or adjusted under 35 U.S.C. 154(b) by 640 days.

(21) Appl. No.: 16/682,181

(22) Filed: Nov. 13, 2019

(65) Prior Publication Data
US 2020/0080634 A1    Mar. 12, 2020

Related U.S. Application Data

(63) Continuation of application No. PCT/JP2018/026479, filed on Jul. 13, 2018.

(30) Foreign Application Priority Data

Jul. 18, 2017 (JP) .............................. JP2017-138901

(51) Int. Cl.
*H02P 23/18* (2016.01)
*F16H 61/02* (2006.01)
(Continued)

(52) U.S. Cl.
CPC ..... *F16H 61/0006* (2013.01); *F16H 61/0204* (2013.01); *F16H 63/04* (2013.01);
(Continued)

(58) Field of Classification Search
CPC ............... F16H 2312/12; F16H 59/105; F16H 59/0204; F16H 63/04; F16H 61/0204;
(Continued)

(56) References Cited

U.S. PATENT DOCUMENTS 7,511,444 B2    3/2009 Nakai et al.
2003/0222617 A1    12/2003 Nakai et al.
(Continued)

FOREIGN PATENT DOCUMENTS

JP    2006188172 A  *  7/2006
JP    4187619    11/2008

*Primary Examiner* — T. Scott Fix
(74) *Attorney, Agent, or Firm* — Nixon & Vanderhye P.C.

(57) ABSTRACT

A shift range control device switches a shift range by controlling driving of a motor. A learning unit learns, as a position correction value, a normal state time correction value calculated based on first and/or second reference angles when an output shaft signal is available when turning on of a start switch. The first reference angle is a motor angle when the output shaft signal changes in response to the rotation of the motor in a first direction. The second reference angle is the motor angle when the output shaft signal changes in response to the motor rotation in a second direction opposite to the first direction. A motor angle target value is set by using the normal state time correction value stored during a period from when all the output shaft signals are determined to be unavailable to when the start switch is turned off.

12 Claims, 6 Drawing Sheets

(51) Int. Cl.
*H02P 23/00* (2016.01)
*F16H 59/02* (2006.01)
*F16H 61/00* (2006.01)
*F16H 63/04* (2006.01)
*F16H 59/10* (2006.01)

(52) U.S. Cl.
CPC ........ *H02P 23/0031* (2013.01); *H02P 23/183* (2016.02); *F16H 59/0204* (2013.01); *F16H 59/105* (2013.01); *F16H 2312/12* (2013.01)

(58) Field of Classification Search
CPC ......... F16H 61/0006; F16H 2061/0087; F16H 2061/0093; F16H 2061/122; F16H 2061/1224; F16H 2061/326; F16H 61/0213; F16H 61/12; H02P 23/0031; H02P 23/183
USPC .............................................................. 74/2
See application file for complete search history.

(56) References Cited

U.S. PATENT DOCUMENTS

| | | | |
|---|---|---|---|
| 2005/0156550 A1* | 7/2005 | Kamio | H02P 25/08 73/1.79 |
| 2005/0174084 A1* | 8/2005 | Nakai | F16H 61/32 318/632 |
| 2006/0033464 A1 | 2/2006 | Nakai et al. | |
| 2006/0103339 A1* | 5/2006 | Yamada | G05B 5/01 318/623 |
| 2006/0197489 A1 | 9/2006 | Nakai et al. | |
| 2007/0182353 A1 | 8/2007 | Kamio et al. | |
| 2008/0001568 A1* | 1/2008 | Hori | F16H 61/32 318/652 |
| 2008/0040009 A1* | 2/2008 | Kamada | F16H 63/3491 477/115 |
| 2008/0103665 A1* | 5/2008 | Kubonoya | F16H 61/32 701/59 |
| 2008/0113848 A1* | 5/2008 | Inoue | F16H 61/12 477/98 |
| 2009/0091284 A1* | 4/2009 | Isobe | F16H 61/32 318/634 |
| 2009/0193923 A1 | 8/2009 | Nakai et al. | |
| 2010/0161187 A1* | 6/2010 | Ito | F16H 61/32 701/58 |
| 2010/0250055 A1* | 9/2010 | Ito | F16H 61/12 701/29.2 |
| 2011/0068730 A1 | 3/2011 | Nakai et al. | |
| 2012/0119689 A1* | 5/2012 | Yamada | H02P 23/18 318/630 |
| 2015/0000450 A1* | 1/2015 | Yatou | F16H 59/105 74/473.12 |

* cited by examiner

SHIFT RANGE CONTROL DEVICE

CROSS REFERENCE TO RELATED APPLICATION

The present application is a continuation of International Patent Application No. PCT/JP2018/026479 filed on Jul. 13, 2018, which designated the U.S. and claims the benefit of priority from Japanese Patent Application No. 2017-138901 filed on Jul. 18, 2017. The entire disclosures of all of the above applications are incorporated herein by reference.

FIELD

The present disclosure relates to a shift range control device.

BACKGROUND ART

Conventionally, a shift range switching device, which switches a shift range by controlling a motor in accordance with a shift range switching request from a driver, is known. For example, an output shaft sensor for detecting a rotation angle of an output shaft fitted and coupled to a rotation shaft of a speed reducer that decelerates and transmits rotation of a motor is provided, and driving of the motor is controlled based on a detection value of the output shaft sensor and a detection value of an encoder which detects rotation of a rotor. The driving of the motor is controlled using the detection value of the output shaft sensor and the encoder. When an abnormality occurs in the output shaft sensor, there is a possibility that the driving of the motor cannot be properly controlled.

SUMMARY

A shift range control device according to the present disclosure is provided to switch a shift range by controlling driving of a motor, and configured to: acquire a motor rotation angle signal outputted from a motor rotation angle sensor, which detects a rotation position of the motor, and calculate a motor angle; acquire output shaft signals, which are output from an output shaft sensor for detecting a rotation position of an output shaft to which rotation of the motor is transmitted, values of the output shaft signals changing in steps in accordance with the rotation position of the output shaft; learn a position correction value, which is used to calculate a motor angle target value; store the position correction value; set the motor angle target value according to a target shift range by using the position correction value; control the driving of the motor such that the motor angle becomes the motor angle target value; and check whether the output shaft signals are available to be used.

BRIEF DESCRIPTION OF THE DRAWINGS

The above and other objects, features and advantages of the present disclosure will become more apparent from the following detailed description made with reference to the accompanying drawings. In the drawings.

EMBODIMENT

First Embodiment

Figure 1:
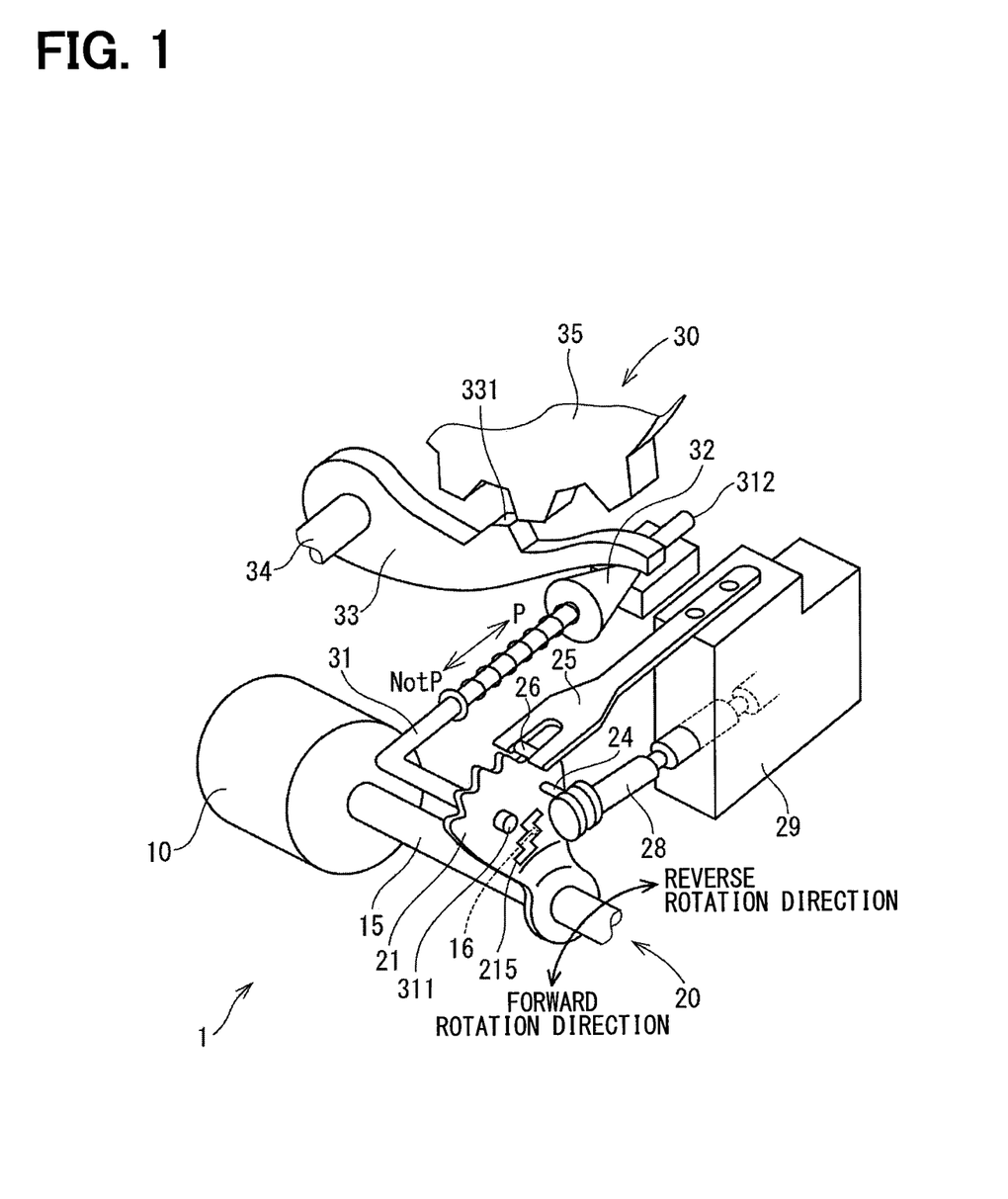
FIG. 1 is a perspective view showing a shift-by-wire system according to one embodiment.
Figure 2:
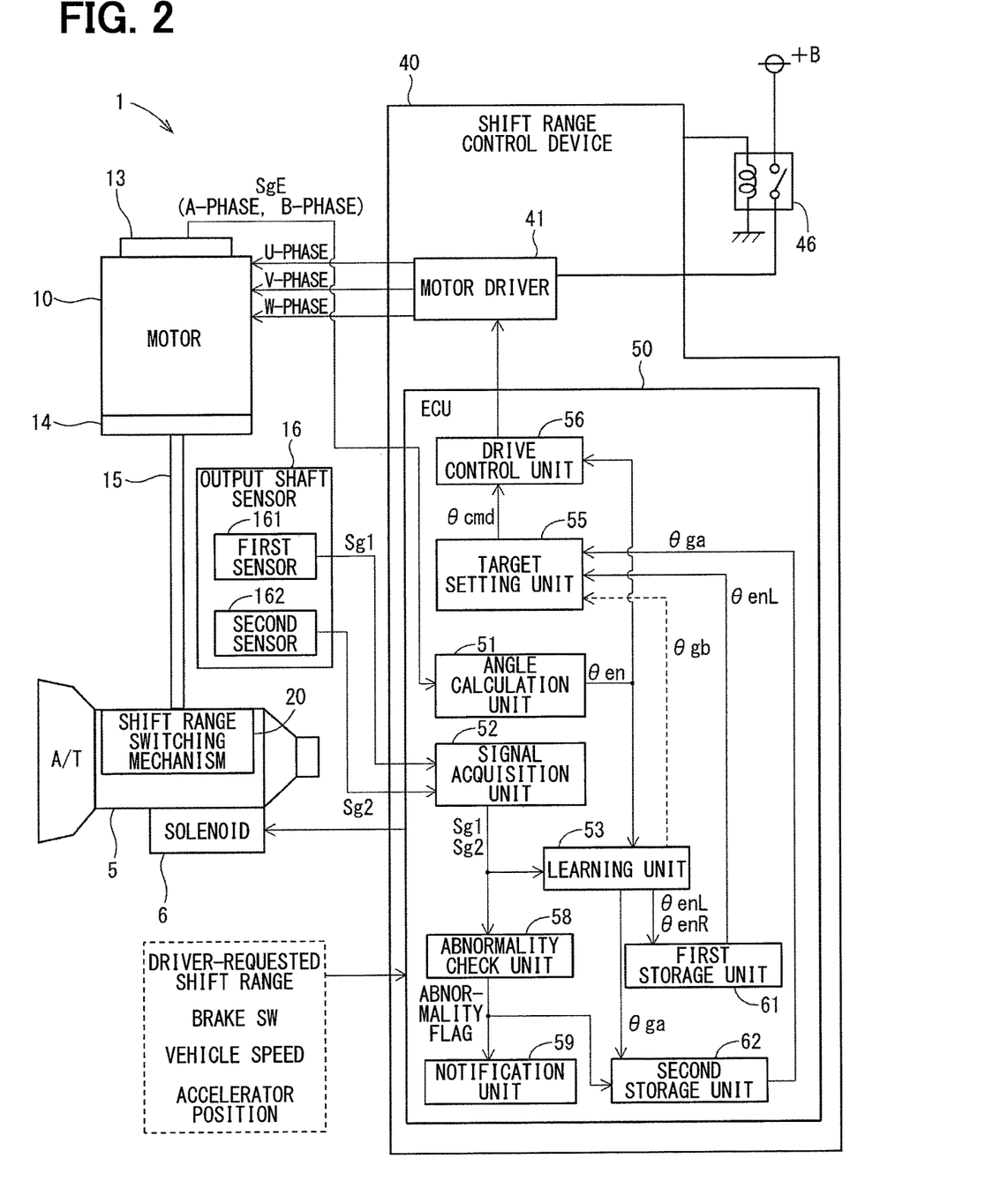
FIG. 2 is a block diagram generally showing a configuration of the shift-by-wire system according to the embodiment.

A shift range control device will be hereinafter described with reference to the drawings. As shown in FIG. 1 and FIG. 2, a shift-by-wire system 1 as a shift range switching device includes a motor 10, a shift range switching mechanism 20, a parking lock mechanism 30, a shift range control device 40 and the like. The motor 10 is rotated by power supplied from a battery which is installed in a vehicle (not shown) and functions as a drive source of the shift range switching mechanism 20. The motor 10 of the present embodiment is a permanent magnet type DC brushless motor.

As shown in FIG. 2, an encoder 13 as a motor rotation angle sensor detects a rotation position of a rotor (not shown) of the motor 10. The encoder 13 is a magnetic type rotary encoder, for example, and includes a magnet rotating with the rotor, a Hall IC for detecting magnetism or the like. The encoder 13 outputs A-phase and B-phase pulse signals at each predetermined angular interval in synchronism with rotation of the rotor. Hereinafter, the signal from the encoder 13 is referred to as a motor rotation angle signal SgE. In the present embodiment, the encoder 13 is configured as a single system that outputs one signal each for the A-phase and the B-phase. In the present embodiment, the encoder 13 has higher angle detection accuracy than an output shaft sensor 16.

A speed reducer 14 is provided between a motor shaft 105 (refer to FIG. 3) of the motor 10 and an output shaft 15. The speed reducer 14 reduces the rotation of the motor 10 and outputs the rotation of the motor to the output shaft 15. The rotation of the motor 10 is thus transmitted to the shift range switching mechanism 20.

The output shaft sensor 16 has a first sensor unit 161 and a second sensor unit 162, and detects the rotation position of the output shaft 15. The output shaft sensor 16 according to the present embodiment is a magnetic sensor that detects a change in the magnetic field of a target 215 (refer to FIG. 1) provided on a detent plate 21, which is a rotation member described later. The output shaft sensor 16 is attached to a position where the magnetic field of the target 215 is detectable. In the figure, the first sensor unit 161 is labeled as a first sensor and the second sensor unit 162 is labeled as a second sensor.

The sensor units 161 and 162 are so-called MR sensors having magneto-resistive elements (MR elements), which detect changes in the magnetic field of the target 215. The first sensor unit 161 detects a magnetic field corresponding to the rotation position of the target 215, and outputs an output shaft signal Sg1 to an ECU (electronic control unit) 50. The second sensor unit 162 detects a magnetic field corresponding to the rotation position of the target 215, and outputs an output shaft signal Sg2 to the ECU 50. The output shaft sensor 16 of the present embodiment includes the two sensor units 161 and 162, and independently transmits the output shaft signals Sg1 and Sg2 to the ECU 50. That is, the output shaft sensor 16 has a double system.

In the present embodiment, the output shaft sensor 16 is a magnetic sensor that detects a change in the magnetic field of the target 215 without contact. Thereby, as compared with a contact type sensor, the output shaft signals Sg1 and Sg2 can be easily multiplexed without largely changing the configuration on an actuator side. The output shaft signals Sg1 and Sg2 can be suitably used for abnormality monitoring such as diagnosis and failsafe of the shift-by-wire system 1 because the output shaft signals Sg1 and Sg2 can meet a request for relatively high safety by multiplexing (in the present embodiment, doubling) the output shaft signals Sg1 and Sg2.

As shown in FIG. 1, the shift range switching mechanism 20 includes a detent plate 21, a detent spring 25 and the like. The shift range switching mechanism 20 transmits the rotational drive force output from the speed reducer 14 to a manual valve 28 and a parking lock mechanism 30.

The detent plate 21 is fixed to the output shaft 15 and rotates integrally with the output shaft 15 when the motor 10 is driven. The detent plate 21 has a pin 24 protruding in parallel with the output shaft 15. The pin 24 is connected to the manual valve 28. As the detent plate 21 is driven by the motor 10, the manual valve 28 reciprocates in its axial direction. That is, the shift range switching mechanism 20 converts a rotational movement of the motor 10 into a linear movement and transmits the linear movement to the manual valve 28. The manual valve 28 is provided to a valve body 29. The reciprocating movement of the manual valve 28 in the axial direction switches hydraulic pressure supply paths to a hydraulic clutch (not shown) to switch an engaged state of a hydraulic clutch, so that the shift range is switched.

Figure 3:
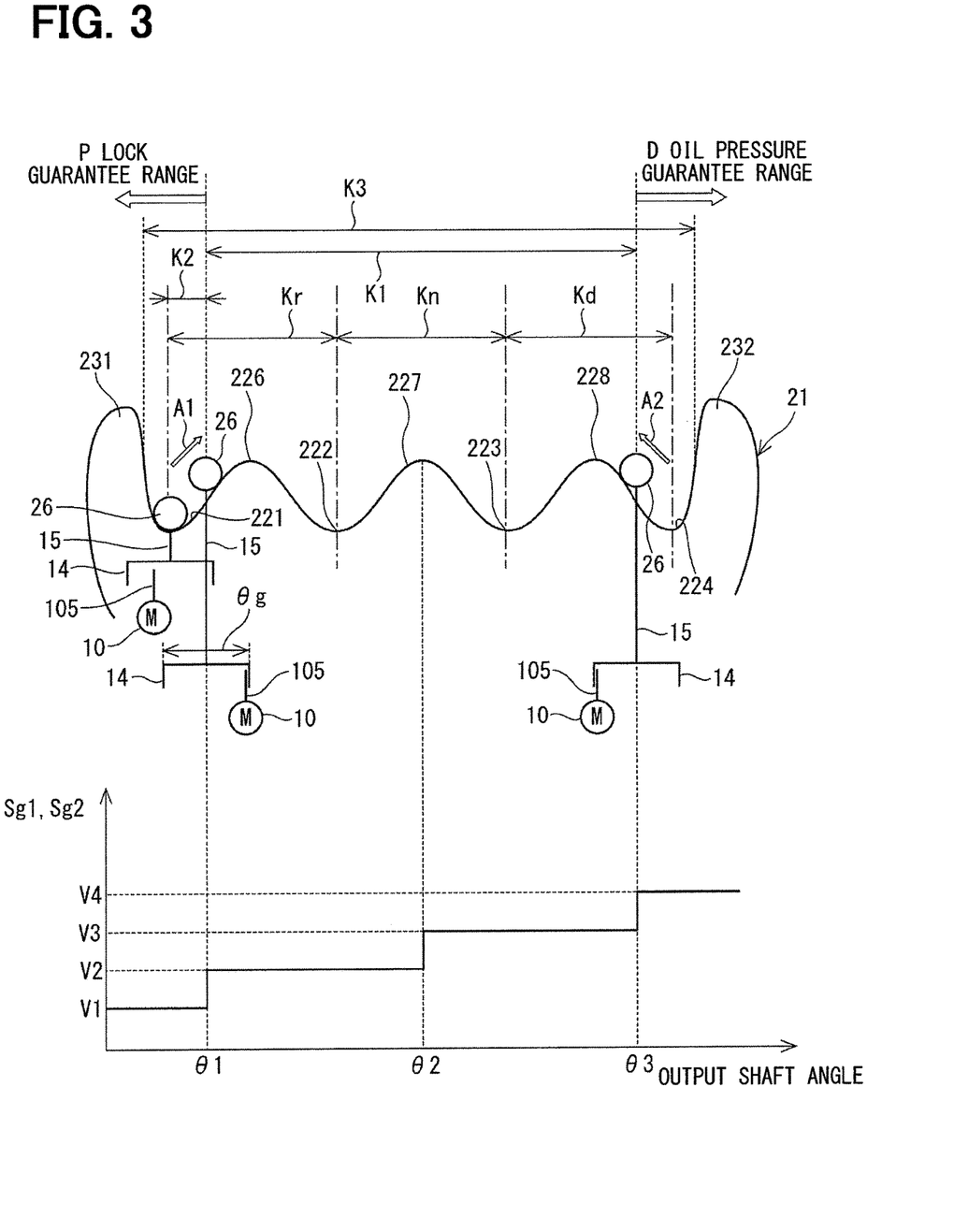
FIG. 3 is an explanatory view showing learning of a rattle width based on an output shaft signal according to the embodiment.

As schematically shown in FIG. 3, four valley sections 221 to 224 are provided on a detent spring 25 side of the detent plate 21. A first valley section 221, a second valley section 222, a third valley section 223 and a fourth valley section 224 correspond to a P-range, an R range, an N-range and a D-range, respectively. Further, a first ridge section 226, a second ridge section 227 and a third ridge section 228 are provided between the first valley section 221 and the second valley section 222, between the second valley section 222 and the third valley section 223 and between the third valley section 223 and the fourth valley section 224, respectively. In FIG. 3, a one-dot chain line indicates each center position of the valley sections 221 to 224.

A wall section 231 is formed on a side opposite to the first ridge section 226 of the first valley section 221. A wall section 232 is formed on a side opposite to the fourth valley section 224 to the third ridge section 228. The wall sections 231 and 232 are formed to be higher in height than the ridge sections 226 to 228. When the detent plate 21 rotates in a reverse direction in a state where the detent roller 26 is in the first valley section 221, the movement of the detent roller 26 is limited by the wall section 231 to restrict the detent roller 26 from moving beyond the wall section 231. When the detent plate 21 rotates in a forward direction in a state where the detent roller 26 is in the fourth valley section 224, the movement of the detent roller 26 is limited by the wall section 232 to restrict the detent roller 26 from moving beyond the wall section 232.

As shown in FIG. 1, the detent plate 21 is provided with the target 215 whose magnetic field changes according to the rotation of the output shaft 15. The target 215 is formed of a magnetic material. The target 215 may be a separate member from the detent plate 21. Alternatively, the target 215 may be formed by pressing, for example, in case that the detent plate 21 is a magnetic material. The target 215 is formed such that output voltages, which are the output shaft signals Sg1 and Sg2 of the output shaft sensor 16, change stepwise in accordance with the rotation position of the output shaft 15. Details of the output shaft signals Sg1 and Sg2 will be described later.

The detent spring 25 is a resiliently deformable plate-like member provided with a detent roller 26 at a tip end. The detent roller 26 is an engagement member. The detent roller 26 fits in one of the valley sections 221 to 224. In the present embodiment, since the number of valley sections 221 to 224 formed in the detent plate 21 is four, the number of engagement positions in which the detent roller 26 engages is four.

The detent spring 25 presses the detent roller 26 toward a rotation center of the detent plate 21. When a rotational force equal to or larger than a predetermined level is applied to the detent plate 21, the detent spring 25 is deformed resiliently to enable the detent roller 26 to move among the valley sections 221 to 224. When the detent roller 26 fits into one of the valley sections 221 to 224, swing movement of the detent plate 21 is restricted. In this way, the axial position of the manual valve 28 and the state of the parking lock mechanism 30 are determined and the shift range of the automatic transmission 5 is fixed.

The parking lock mechanism 30 includes a parking rod 31, a conical member 32, a parking lock pawl 33, a shaft part 34 and a parking gear 35. The parking rod 31 is generally L-shaped, and one end 311 side is fixed to the detent plate 21. The conical member 32 is provided to the other end 312 side of the parking rod 31. The conical member 32 is formed so as to contract toward the other end 312 side. When the detent plate 21 pivots in the reverse rotation direction, the conical member 32 moves toward a direction of an arrow P.

The parking lock pawl 33 is provided to abut on a conical surface of the conical member 32 and pivot about the shaft part 34. On the parking gear 35 side of the parking lock pawl 33, the parking lock pawl 33 has a protrusion 331 that can mesh with the parking gear 35. When the detent plate 21 rotates in the reverse rotation direction and the conical member 32 moves in the direction of the arrow P, the parking lock pawl 33 is pushed up so that the protrusion 331 meshes with the parking gear 35. By contrast, when the detent plate 21 rotates in the forward rotation direction and the conical member 32 moves in a direction of arrow "NotP", the protrusion 331 is released from meshing with the parking gear 35.

The parking gear 35 is placed at an axle (not shown) so as to be capable of meshing with the protrusion 331 of the parking lock pawl 33. The parking gear 35 meshing with the protrusion 331 restricts the rotation of the axle. When the shift range is one of NotP-ranges, which are other than the P-range, the parking gear 35 is not locked by the parking lock pawl 33 and the rotation of the axle is not restricted by the parking lock mechanism 30. When the shift range is the P-range, the parking gear 35 is locked by the parking lock pawl 33 and the rotation of the axle is restricted.

As shown in FIG. 2, the shift range control device 40 includes a motor driver 41, the ECU 50 and the like. The motor driver 41 outputs a drive signal related to energization of each phase (U-phase, V-phase, W-phase) of the motor 10. A motor relay 46 is provided between the motor driver 41 and a battery. The motor relay 46 is turned on when a start switch of a vehicle, such as an ignition switch, is turned on, so that power is supplied to the motor 10. The motor relay 46 is turned off when the start switch is turned off, so that power supply to the motor 10 side is shut down.

The ECU 50 is mainly formed of a microcomputer or the like, and internally includes, although not shown, a CPU, a ROM, a RAM, an I/O, a bus line for connecting these components, and the like. Each process executed by the ECU 50 may be software process or may be hardware process. The software process may be implemented by causing the CPU to execute a program. The program may be stored beforehand in a memory device such as a ROM, that is, in a readable non-transitory tangible storage medium. The hardware process may be implemented by a special purpose electronic circuit.

The ECU 50 controls switching of the shift range by controlling driving of the motor 10 based on a driver-requested shift range, a signal from a brake switch, a vehicle speed and the like. The ECU 50 controls the driving of a transmission hydraulic pressure control solenoid 6 based on the vehicle speed, an accelerator position, the driver-requested shift range and the like. By controlling the transmission hydraulic pressure control solenoid 6, the shift stage is controlled. The transmission hydraulic pressure control solenoid 6 is provided in number in correspondence to the number of the shift ranges and the like. In the present embodiment, one ECU 50 controls the driving of the motor 10 and the solenoid 6. However, the ECU 50 may be divided into a motor ECU for motor control and an AT-ECU for solenoid control. Hereinafter, the drive control for the motor 10 will be mainly explained.

The ECU 50 is configured to execute by software various processes by software. These processes are indicated as an angle calculation unit 51, a signal acquisition unit 52, a learning unit 53, a target setting unit 55, a drive control unit 56, an abnormality check unit 58, a notification unit 59, a first storage unit 61, a second storage unit 62, and the like. The angle calculation unit 51 calculates an encoder count value θen which is a count value of the encoder 13 based on the motor rotation angle signal SgE output from the encoder 13. The encoder count value θen is a value which corresponds to actual mechanical angle and electrical angle of the motor 10. In the present embodiment, the encoder count value θen corresponds to the motor angle. The signal acquisition unit 52 acquires the output shaft signals Sg1 and Sg2 output from the output shaft sensor 16. In the present embodiment, the output shaft signals Sg1 and Sg2 are directly acquired from the output shaft sensor 16. Alternatively, these signals may be acquired from another ECU or the like via a vehicle communication network such as CAN (Controller Area Network).

The learning unit 53 learns a rattle width θg which is a total of plays between the motor shaft 105 (see FIG. 3) and the output shaft 15. The target setting unit 55 sets a target shift range based on the driver-requested shift range based on a shift switch or the like, the vehicle speed, the signal from the brake switch, and the like. Further, the target setting unit 55 sets a target count value θcmd, which is a motor angle target value, according to the target shift range. Details of learning of the rattle width θg, setting of the target count value θcmd and the like will be described later.

The drive control unit 56 controls the driving of the motor 10 by feedback control or the like so that the motor 10 is stopped at the rotation position where the encoder count value θen becomes the target count value θcmd. Details of the motor drive control for the motor 10 are not limited in particular.

The abnormality check unit 58 monitors an abnormality of the output shaft signals Sg1 and Sg2. When the first output shaft signal Sg1 is abnormal, a first abnormality flag X_err1 is set. When the second output shaft signal Sg2 is abnormal, a second abnormality flag X_err2 is set. The abnormality flags X_err1 and X_err2 are stored in the second storage unit 62 described later. Thus, the abnormality flags X_err1 and X_err2 are held even when the start switch is turned off.

When the first output shaft signal Sg1 is equal to or lower than a normal lower limit value TH1 (for example, 0.5 [V]) or equal to or higher than a normal upper limit value TH2 (for example, 4.5 [V]), the abnormality check unit 58 determines that the first output shaft signal Sg1 is abnormal and sets the first abnormality flag X_err1. The first output shaft signal Sg1 is unavailable to be used if the first abnormality flag X_err1 is set, and is available to be used if the first abnormality flag is not set.

Similarly, when the second output shaft signal Sg2 is equal to or lower than the normal lower limit value TH1 or equal to or higher than the normal upper limit value TH2, the abnormality check unit 58 determines that the second output shaft signal Sg2 is abnormal and sets the second abnormality flag X_err1. The second output shaft signal Sg2 is unavailable to be used if the second abnormality flag X_err2 is set, and is available to be used if the second abnormality flag is not set.

The normal lower limit value TH1 and the normal upper limit value TH2 may be set arbitrarily. In the present embodiment, the values relating to checking of the first output shaft signal Sg1 and the value relating to checking of the second output shaft signal Sg2 are the same but may be different. A range higher than the normal lower limit value TH1 and lower than the normal upper limit value TH2 is set as a normal range.

Further, when both output shaft signals Sg1 and Sg2 are within the normal range and a difference between the first output shaft signal Sg1 and the second output shaft signal Sg2 is larger than a difference check threshold value THd, the abnormality check unit 58 determines that an abnormality is present in one of the output shaft signals Sg1 and Sg2. If the difference between the output shaft signals Sg1 and Sg2 is larger than the difference check threshold value THd, it is not possible to specify which one is abnormal. Therefore, both abnormality flags X_err1 and X_err2 are set, and both output shaft signals Sg1 and Sg2 are determined to be unavailable to be used.

When one of the output shaft signals Sg1 and Sg2 is within the normal range and the other is outside the normal range, the one of the output shaft signals Sg1 and Sg2, which is in the normal range, is regarded as normal. Rθgarding the motor rotation angle signal SgE, an abnormality is separately monitored. It is assumed in the following description that the motor rotation angle signal SgE is normal.

When the abnormality occurs in at least one of the output shaft signals Sg1 and Sg2, the notification unit 59 warns the driver that the shift-by-wire system 1 has the abnormality. The notification unit 59 turns on, for example, a warning light provided in an instrumental panel to warn that the shift-by-wire system 1 is abnormal. A method of warning to a user is not limited to lighting of the warning light, but may be any method such as guidance by voice. This will encourage the user to bring in the vehicle to a repair shop, etc.

The first storage unit 61 is, for example, a volatile memory such as a RAM. Electric power is supplied to the first storage unit 61 via the start switch. Therefore, information stored in the first storage unit 61 is erased when the start switch is turned off. The second storage unit 62 is, for example, a volatile memory such as an SRAM. Power is directly supplied to the second storage unit 62 from the battery directly without passing through the start switch.

Therefore, information stored in the second storage unit 62 is not erased but held stored even when the start switch is turned off. As the second storage unit 62, a non-volatile memory such as an EEPROM may be used, for example. It is noted in FIG. 2 that some of control lines are not shown for simplicity.

FIG. 3 schematically shows the detent plate 21 and the like in the upper part, and the output shaft signals Sg1 and Sg2 in the lower part. An angle design value Kr between centers of the valley sections 221 and 222, an angle design value Kn between centers of the valley sections 222 and 223 and an angle design value Kd between centers of the valley sections 223 and 224, which are shown in FIG. 3, are stored in advance in the ROM (not shown) or the like. In addition, an angle design value K1 between angles 81 and 83 described later at which the output shaft signals Sg1 and Sg2 change, and an angle design value K2 between the angle θ1 at which the output shaft signals Sg1 and Sg2 change and the center of the first valley section 221 are also stored in advance in the ROM or the like. Furthermore, an angle design value K3 between the wall sections 231 and 232 is stored in advance in the ROM or the like. The angle design value K3 can be regarded as a design value of the movable range of the detent roller 26. In the present embodiment, all the angle design values Kn, Kr, Kd, K1, K2 and K2 are values, which correspond to the count values of the encoder 13, but may be any values that can be converted into angles.

Output shaft angle θs is an angle corresponding to the rotation position of the output shaft 15. This angle is θ1 when the detent roller 26 is at a predetermined position between the center of the first valley section 221 and a top of the first ridge section 226. This angle is θ2 when the detent roller 26 is located at a top of the second ridge section 227. This angle is θ3 when the detent roller 26 is at a predetermined position between a top of the third ridge section 228 and the center of the fourth valley section 224. In the present embodiment, the angle θ1 is set in the same manner as a boundary value of a P lock guarantee range that guarantees the parking lock by the parking lock mechanism 30. Further, the angle θ3 is set in the same manner as a boundary value of a D hydraulic oil pressure guarantee range which guarantees a hydraulic oil pressure of a drive range in the automatic transmission 5.

When the output shaft angle θs is smaller than the angle θ1, the output shaft signals Sg1 and Sg2 are constant at a value V1. When the output shaft angle θs becomes the angle θ1, the output shaft signals Sg1 and Sg2 change from the value V1 to a value V2. The output shaft signals Sg1 and Sg2 are constant at the value V2 in a range where the output shaft angle θs is equal to or larger than the angle θ1 and smaller than the angle θ2. When the output shaft angle θs becomes the angle θ2, the output shaft signals Sg1 and Sg2 change from the value V2 to a value V3. The output shaft signals Sg1 and Sg2 are constant at the value V3 in a range where the output shaft angle θs is equal to or larger than the angle θ2 and smaller than the angle θ3. When the output shaft angle θs becomes the angle θ3, the output shaft signals Sg1 and Sg2 change to a value V4. When the output shaft angle θs is equal to or larger than the angle θ3, the output shaft signals Sg1 and Sg2 are constant at the value V4.

The values V1, V2, V3 and V4 to which the output shaft signals Sg1 and Sg2 change possibly are discrete and not an intermediate value between two adjacent values. Further, a difference between the value V1 and the value V2, a difference between the value V2 and the value V3, and a difference between the value V3 and the value V4 are set to be sufficiently large values, respectively, as compared with the resolution and the sensor error. That is, in the present embodiment, the switching of the value from the first value to the second value, which differs to such an extent that it cannot be regarded as a continuous value in the movement among the valley sections 221 to 224 of the detent roller 26, is referred to as a stepwise change. The differences between the value V1 and the value V2, between the value V2 and the value V3 and between the value V3 and the value V4 may be equal or different one another. In the present embodiment, the values are assumed to be in a magnitude relation V1<V2<V3<V4, but this magnitude relationship of the values V1 to V4 may be different.

In the present embodiment, the number of engagement positions of the detent roller 26 is four. The output shaft sensor 16 and the target 215 are provided so that the output shaft signals Sg1 and Sg2 change in four steps according to the engagement position of the detent roller 26. That is, in the present embodiment, the number of engagement positions and the number of steps of the output voltages that can be taken by the output shaft signals Sg1 and Sg2 coincide with each other. For example, in case that the output shaft signal is an analog signal that changes continuously according to the rotational position of the output shaft 15 as a reference example, a signal process such as AD conversion is required. In the present embodiment, the output shaft signals Sg1 and Sg2 change stepwise according to the shift range. In case that the output shaft signals Sg1 and Sg2 have four steps or so, the signal process such as AD conversion in the output shaft sensor 16 becomes unnecessary, so the configuration of the output shaft sensor 16 can be simplified.

In the illustration provided in the upper part of FIG. 3, a play between the motor shaft 105 and the output shaft 15 is conceptually shown. Here, illustration is made on an assumption that the output shaft 15 and the speed reducer 14 are integrated with each other and that the motor shaft 105 is movable within a range of play of the speed reducer 14. However, it may alternatively be configured such that the motor shaft 105 and the speed reducer 14 are integrated with each other and a play exists between the speed reducer 14 and the output shaft 15. Here, the play between the motor shaft 105 and the output shaft 15 is assumed to exist between the gear of the speed reducer 14 and the motor shaft 105. It is noted that the play may be regarded as a sum of plays, rattle and the like. Hereinafter, the total of the plays between the motor shaft 105 and the output shaft 15 is referred to as the rattle width θg.

In practice, the detent roller 26 moves between the valley sections 221 to 224 by the rotation of the detent plate 21 integrally with the output shaft 15. However, in FIG. 3, the detent roller 26 is illustrated assumedly as rotating with the output shaft 15. In FIG. 3, the rotation direction for rotating the detent plate 21 so that the detent roller 26 moves in the direction of arrow A1 is a first direction, and the rotation direction for rotating the detent plate 21 so that the detent roller 26 moves in the direction of arrow A2 is a second direction.

The speed reducer 14 is provided between the motor shaft 105 and the output shaft 15 and the play including gear backlash is present therebetween. In the present embodiment, the motor 10 is the DC brushless motor. Therefore, when the power is not supplied to the motor 10, the motor shaft 105 rotates within the play because of cogging torque, for example, and the motor shaft 105 and the output shaft 15 tend to be separated. In addition, when the power supply to the motor 10 is shut down at the position where the detent roller 26 is not in the center of the valley section 221 to 224, it is likely that the detent roller 26 cannot be pushed in the center of the valley section 221 to 224 by the spring force of the detent spring 25 properly because of the influence of the cogging torque. Therefore, in the present embodiment, the stop position of the motor 10 is controlled accurately by learning the rattle width θg based on the output shaft signals Sg1, Sg2 and the encoder count value θen and setting the target count value θcmd using the rattle width θg.

The normal state time learning process executed when at least one of the output shaft signals Sg1 and Sg2 is available to be used will be described. When the start switch is off, the shift range is the P-range and the detent roller 26 is located at the center of the first valley section 221. At this time, the motor 10 is likely to rotate within the range of the rattle width θg due to the cogging torque. It is thus difficult to specify at which position within the rattle width θg the motor 10 is located at time immediately after the start.

When the target shift range is switched from the P-range to the range other than the P-range as indicated by the arrow A1, the detent roller 26 moves from the first valley section 221 to the first ridge section 226 side by the rotation of the detent plate 21. When the detent roller 26 passes through the center of the first valley section 221 and is in a so-called hill climbing state, the motor shaft 105 and the output shaft 15 are integrally rotated.

In the present embodiment, the angle θ1 which is the change point at which the output shaft signals Sg1 and Sg2 change is set between the center of the first valley section 221 and the top of the first ridge section 226. That is, when the detent plate 21 is rotated in the first direction from the state in which the detent roller 26 is fitted in the first valley section 221 corresponding to the P-range, the motor shaft 105 is in contact with the speed reducer 14 at one end side of the rattle width θg at the point where the output shaft signals Sg1 and Sg2 first change. The encoder count value θen at this time is stored in the first storage unit 61 as a first reference angle θenL.

When the target shift range is switched from the D-range to the range other than the D-range as indicated by the arrow A2, the detent roller 26 moves from the fourth valley section 224 to the third ridge section 228 by the rotation of the detent plate 21. When the detent roller 26 passes through the center of the fourth valley section 224 and is in a so-called hill climbing state, the motor shaft 105 and the output shaft 15 are integrally rotated.

In the present embodiment, the angle θ3 which is the change point at which the output shaft signals Sg1 and Sg2 change is set between the top of the third ridge section 228 and the center of the fourth valley section 224. That is, when the detent plate 21 is rotated in the second direction from the state in which the detent roller 26 is fitted in the fourth valley section 224, the motor shaft 105 is in contact with the speed reducer 14 at the other end side of the rattle width θg at the point where the output shaft signals Sg1 and Sg2 first change. The encoder count value Ben at this time is stored in the first storage unit 61 as a second reference angle θenR.

In the normal state time learning process, the angle between the angle θ1 and the angle θ3 is stored in the second storage unit 62 as the angle design value K1. Therefore, it is possible to calculate the normal state time rattle width learning value θga as the normal state time correction value (see equation (1)) based on the first reference angle θenL, the second reference angle θenR and the angle design value K1. The calculated normal state time rattle width learning value θga is stored in the second storage unit 62.

$$\theta ga = \{K1 - (\theta enR - \theta enL)\} \tag{1}$$

The angle design value K2 between the angle θ1 which is the first change point and the center of the first valley section 221 is stored in advance. Therefore, based on the reference angle θenL, the angle design value K2 and the normal state time rattle width learning value θga, the P-range center count value θp can be calculated (see equation (2)). This P-range center count value θp is the encoder count value when the detent roller 26 is fitted in the first valley section 221 and the motor shaft 105 is positioned in the center of the rattle width θg. Hereinafter, as appropriate, the state where the motor shaft 105 is positioned at the center of the rattle width θg when the detent roller 26 is fitted in the center of the valley section 221 to 224 is referred to as that the motor 10 is positioned at the center of the valley section 221 to 224.

Further, since the angles between the centers of the valley sections 221 to 224 are stored as the angle design values Kr, Kn and Kd, the R-range center count value θr, the N-range center count value en and the D-range center count value θd of the encoder count values when the motor 10 is positioned at the center of the valley section 222, 223 and 224 can be calculated also (see Equations (3) to (5)).

$$\theta p = \theta enL - K2 - (\theta ga/2) \tag{2}$$

$$\theta r = \theta enL - K2 - (\theta ga/2) + Kr \tag{3}$$

$$\theta n = \theta enL - K2 - (\theta ga/2) + Kr + Kn \tag{4}$$

$$\theta d = \theta\theta nL - K2 - (\theta ga/2) + Kr + Kn + Kd \tag{5}$$

By setting the center count values θp, θr, θn and θd corresponding to the target shift ranges as the target count values θcmd and controlling the motor 10 so that the encoder count value θen becomes the target count value θcmd, the motor 10 can be stopped at the centers of the valley sections 221 to 224. As far as the motor 10 is stopped at the center of the valley sections 221 to 224, the detent roller 26 can be fitted properly in the valley sections 221 to 224 corresponding to the target shift ranges by the spring force of the detent spring 25 without being affected by the cogging torque.

When both of the output shaft signals Sg1 and Sg2 are unavailable to be used, the rattle width θg is learned by an abnormal state time learning process. In the abnormal state time learning process, an abnormal state time rattle width learning value θgb is calculated as an abnormal state time correction value (see equation (6)) based on an encoder counter value θen_Llim output when the motor 10 is rotated until the detent roller 26 abuts the wall section 231, the encoder count value θen_Rlim output when the motor 10 is rotated until the detent roller 26 abuts the wall section 232, and the angle design value K3. Rotating the motor 10 until the detent roller 26 abuts the wall sections 231, 232 corresponds to rotating the motor 10 to the limit position of the movable range.

$$\theta gb = \theta en\_Rlim - \theta en\_Llim - K3 \tag{6}$$

Further, for example, assuming that $\{\theta en\_Lim + (1/2) \times \theta gb\}$ is set as the P-range center count value, the center count values θr, θn and θd of each range can be calculated using the design values Kr, Kn and Kd. The abnormal state time learning process of the present embodiment is a so-called learning process referred to as butting control or wall contact control. The details of the wall contact control in the abnormal state time learning process and the motor control process when the output shaft signals Sg1 and Sg2 are abnormal may be executed in any method. It is noted that, although the value stored in the first storage unit 61 or the second storage unit 62 is used by the target setting unit 55 as the abnormal state time rattle width learning value θgb, it is shown as being directly input to the target setting unit 55 by a broken line in FIG. 2 for the sake of simplification.

In the learning process of the rattle width θg by the wall contact control, the motor 10 is rotated with a relatively large torque to bring the detent roller 26 into contact with the wall sections 231 and 232. As a result, stress is applied to the detent plate 21, the detent roller 26 and the like. Therefore, in the present embodiment, the rattle width θg is learned without performing the wall contact control when the output shaft signals Sg1 and Sg2 are normal, Thereby, the stress applied to the detent plate 21, the detent roller 26 and the like can be reduced.

Figure 4:
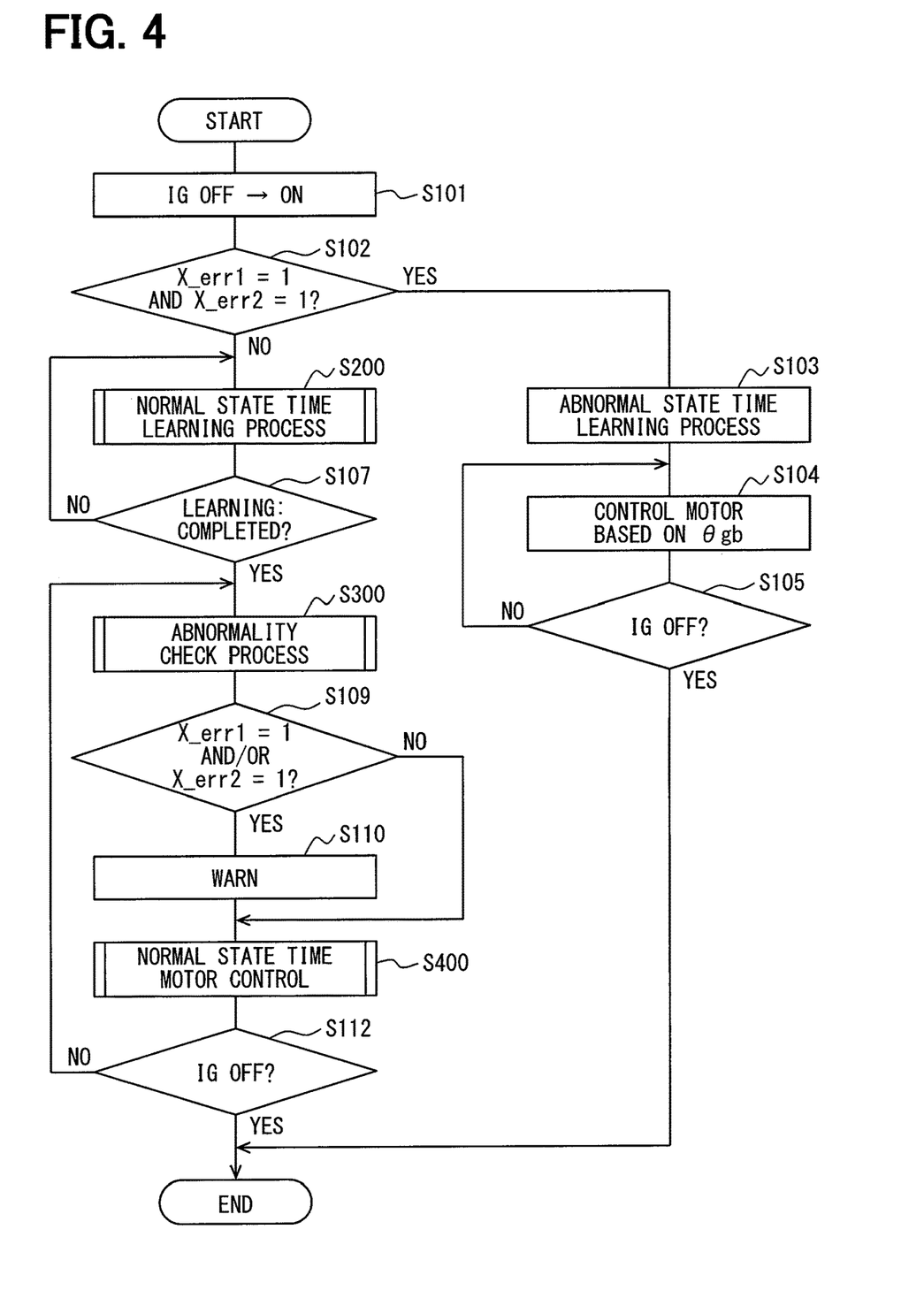
FIG. 4 is a flowchart showing a motor control process according to the embodiment.

The motor control process according to the present embodiment will be described with reference to a flowchart of FIG. 4. Hereinafter, "step" of step S101 is simply indicated as a symbol S. Other steps are also indicated simply as S. In the figure, the start switch is described as "IG". Further, a state in which each flag is set is indicated as "1", and a state in which the flag is not set is indicated as "0".

When the start switch is switched from OFF to ON in S101, the learning unit 53 checks in S102 whether both of the abnormality flags X_err1 and X_err2 are set. If it is determined that at least one of the abnormal flags X_err1 and X_err2 is not set (S102: NO), the process proceeds to S200. If it is determined that the abnormality flags X_err1 and X_err2 are both set (S102: YES), the process proceeds to S103.

In S103, the learning unit 53 learns the abnormal state time rattle width learning value θgb in the abnormal state time learning process. In S104, the target setting unit 55 sets the target count value θcmd using the abnormal state time rattle width learning value θgb. The drive control unit 56 controls the driving of the motor 10 such that the encoder count value θen attains the target count value θcmd. In S105, the ECU 50 checks whether the start switch has been turned off. If it is determined that the start switch has not been turned off (S105: NO), the process returns to S104 and continues the drive control of the motor 10. If it is determined that the start switch has been turned off (S105: YES), the present control is terminated.

Figure 5:
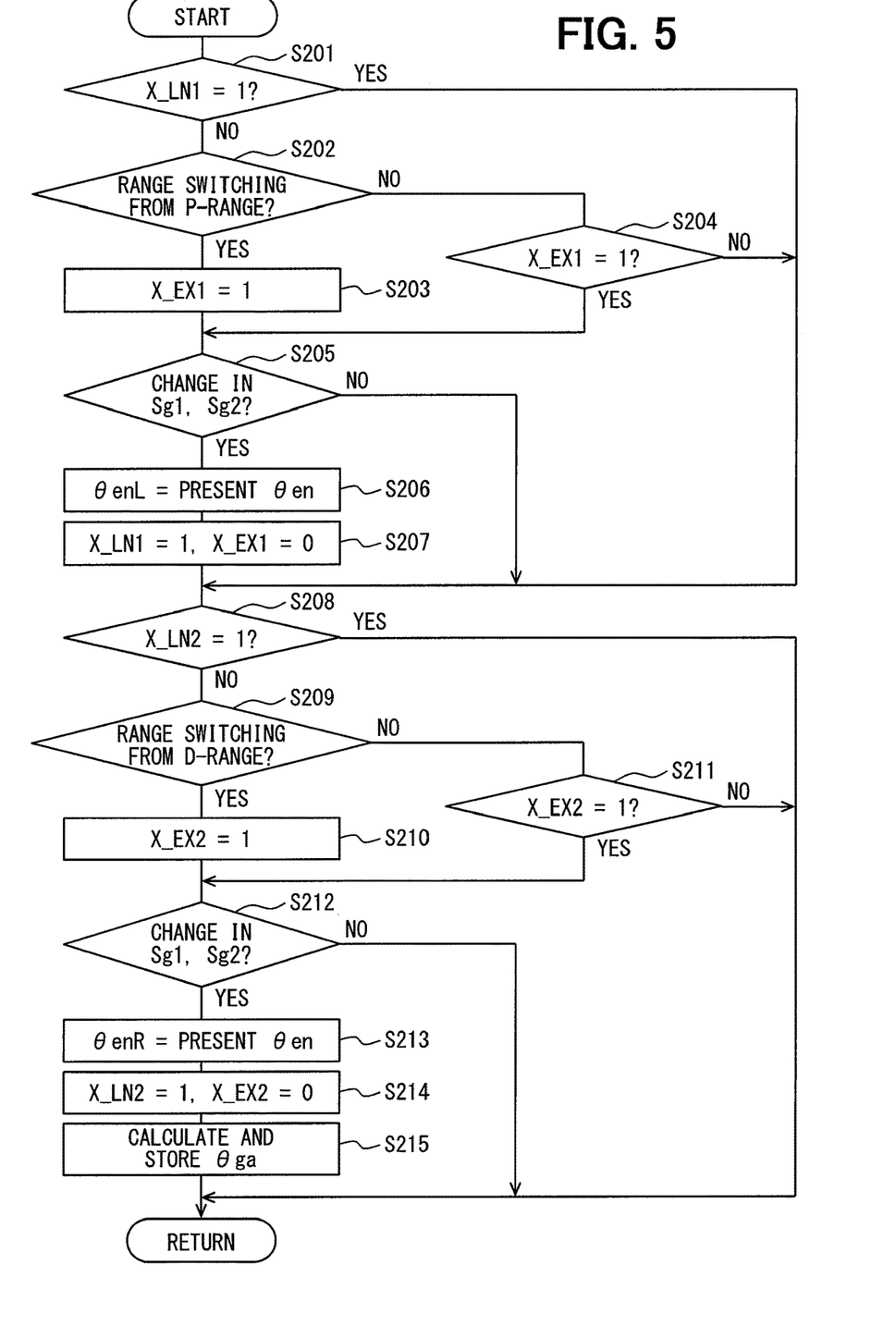
FIG. 5 is a flowchart showing a normal state time learning process according to the embodiment.

In S200, the learning unit 53 performs the normal state time learning process. A flowchart for explaining the normal state time learning process is shown in FIG. 5. In the normal state time learning process, the abnormality flags X_err1 and X_err2 are referred to, and the output shaft signal Sg1 or Sg2 in which no abnormality is present is used. Further, when both of the abnormality flags X_err1 and X_err2 are not set and both of the output shaft signals Sg1 and Sg2 are normal, any one of the output shaft signals Sg1 and Sg2 may be used. In the present embodiment, the output shaft signal Sg1 is preferentially used if the output shaft signal Sg1 is normal.

In S201, the learning unit 53 checks whether a first learning completion flag X_LN1 is set. The first learning completion flag X_LN1 is set when the first reference angle θenL is stored in the first storage unit 61. The first storage unit 61 is a volatile memory. When the start switch is turned off, the first reference angle θenL is erased and the first learning completion flag X_LN1 is reset. If it is determined that the first learning completion flag X_LN1 is set (S201: YES), the process proceeds to S208. If it is determined that the first learning flag X_LN1 is not set (S201: NO), the process proceeds to S202.

In S202, the learning unit 53 checks whether the target shift range has been switched from the P-range to a range other than the P-range. Here, in case that the target shift range in the previous process is the P-range and the target shift range in the present process is other than the P-range, an affirmative determination is made. In other cases, a negative determination is made. If it is determined that the target shift range has been switched from the P-range to the range other than the P-range (S202: YES), the process proceeds to S203 and a first learning execution flag X_EX1 is set. The first learning execution flag X_EX1 indicates that learning of the first reference angle θenL is in progress. If it is determined that the target shift range has not been changed (S202: NO), the process proceeds to S204.

In S204, the learning unit 53 checks whether the first learning execution flag X_EX1 is set. In case it is determined that the first learning flag X_EX1 is not set (S204: NO), the process proceeds to S208. In case it is determined that the first learning execution flag X_EX1 is set (S204: YES), the process proceeds to S205.

In S205, the learning unit 52 checks whether the output shaft signal Sg1, Sg2 has changed from the value V1 to the value V2. In case it is determined that the output shaft signals Sg1, Sg2 have not changed from the value V1 (S205: NO), the process proceeds to S208. In case it is determined that the output shaft signal Sg1, Sg2 has changed from the value V1 to the value V2 (S205: YES), the process proceeds to S206.

In S206, the learning unit 53 stores the current encoder count value θen in the first storage unit 61 as the first reference angle θenL. In S207, the learning unit 53 sets the first learning completion flag X_LN1 and resets the first learning execution flag X_EX1.

In S208, the learning unit 53 checks whether the second learning completion flag X_LN2 is set. The second learning completion flag X_LN2 is set when the normal state time rattle width learning value θga is stored in the second storage unit 62. The second learning completion flag X_LN2 is not reset even when the start switch is turned off, once the learning of the normal state time rattle width learning value θg has been completed. Further, the second learning completion flag X_LN2 is reset when the normal state time rattle width learning value θg is erased by the removal of the battery, the occurrence of battery rundown or the like. Furthermore, the second learning completion flag X_LN2 is reset when turning on and off of the start switch is repeated a predetermined number of times (for example, several thousand times) after the previous learning of the normal state time rattle width learning value θg, and the normal state time rattle width learning value θga is learned again. In case it is determined that the second learning completion flag X_LN2 is set (S208: YES), the process of the routine is terminated without executing process S209 and proceeds to S107 in FIG. 4. In case it is determined that the second learning completion flag X_LN2 is not set (S208: NO), the process proceeds to S209.

In S209, the learning unit 52 checks whether the target shift range has been switched from the D-range to a range other than the D-range. Here, in case that the target shift range in the previous process is the D-range and the target shift range in the present process is other than the D-range, an affirmative determination is made. In other cases, a negative determination is made and the process proceeds to S211. In case it is determined that the target shift range has been switched from the D-range to the range other than the D-range (S209: YES), the process proceeds to S210 and the second learning execution flag X_EX2 is set. The second learning execution flag X_EX2 indicates that learning of the second reference angle θenR is in progress.

In S211, the learning unit 53 checks whether the second learning execution flag X_EX2 is set. In case it is determined that the second learning execution flag X_EX2 is not set (S211: NO), this routine is finished and the process proceeds to S107 shown in FIG. 4. In case it is determined that the second learning execution flag X_EX2 is set (S211: YES), the process proceeds to S212.

In S212, the learning unit 53 checks whether the output shaft signal Sg1, Sg2 has changed from the value V4 to the value V3. In case it is determined that the output shaft signals Sg1 and Sg2 have the value V4 (S212: NO), this routine is terminated and the process proceeds to S107 in FIG. 4. In case it is determined that the output shaft signal Sg1, Sg2 has changed from the value V4 to the value V3 (S212: YES), the process proceeds to S213.

In S213, the learning unit 53 sets the present encoder count value θen as the second reference angle θenR. In S214, the learning unit 53 sets the second learning completion flag X_LN2 and resets the second learning execution flag X_EX2. In S215, the learning unit 53 calculates the normal state time rattle width learning value θga according to the equation (1), and stores the calculated value in the second storage unit 62.

Referring back to FIG. 4, in S107, which is executed following the normal state time learning process in S200, the ECU 50 checks whether the learning of the normal state time rattle width learning value θga has been completed. In case it is determined that the learning of the normal state time rattle width learning value θga is not completed yet (S107: NO), the process returns to S200 and the normal state time learning process is continued. The target count value θcmd is set based on, for example, the angle design values Kr, Kn, Kd and the like until the learning of the normal state time rattle width learning value θga is completed, and thereby the driving of the motor 10 is controlled. In case it is determined that the learning of the normal state time rattle width learning value θga is completed (S107: YES), the process proceeds to S300.

Figure 6:
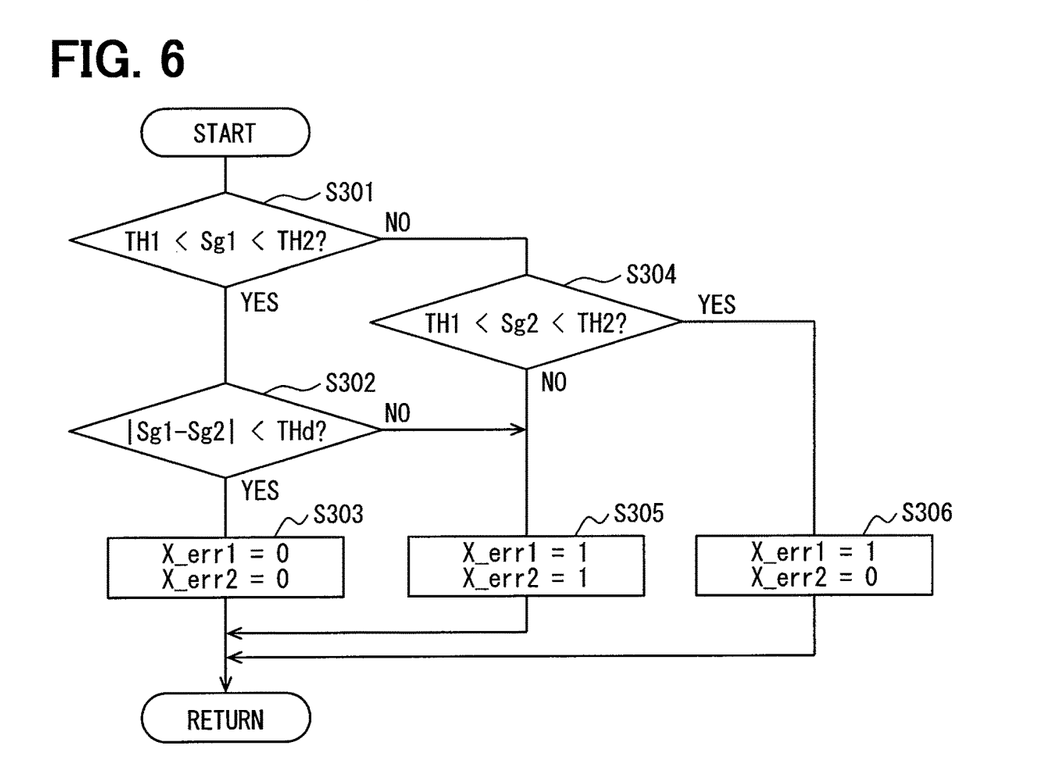
FIG. 6 is a flowchart showing an abnormality check process according to the embodiment.

In S300, the abnormality check unit 58 performs abnormality check process of the output shaft signals Sg1 and Sg2. A flowchart for explaining the abnormality check process is shown in FIG. 6. In S301, the abnormality check unit 58 checks whether the first output shaft signal Sg1 is within the normal range. In more detail, the abnormality check unit 58 checks whether the first output shaft signal Sg1 is larger than the normal lower limit value TH1 and smaller than the normal upper limit value TH2. In case it is determined that the first output shaft signal Sg1 is outside the normal range (S301: NO), the process proceeds to S304. If it is determined that the first output shaft signal Sg1 is within the normal range (S301: YES), the process proceeds to S302.

In S302, the abnormality check unit 58 checks whether an absolute value of the difference between the first output shaft signal Sg1 and the second output shaft signal Sg2 is smaller than the difference check threshold value THd. In case it is determined that the absolute value of the difference between the first output shaft signal Sg1 and the second output shaft signal Sg2 is equal to or larger than the difference check threshold value THd (S302: NO), it is determined that there is a deviation abnormality in the output shaft signals Sg1 and Sg2. In this case, the process proceeds to S305. If it is determined that the absolute value of the difference between the first output shaft signal Sg1 and the second output shaft signal Sg2 is smaller than the difference determination threshold value THd (S302: YES), the process proceeds to S303. In S303, the abnormality check unit 58 resets both of the abnormality flags X_err1 and X_err2.

In S304 which is executed when it is determined that the first output shaft signal Sg1 is outside the normal range (S301: NO), the abnormality check unit 58 checks whether the second output shaft signal Sg2 is in the normal range. In more detail, the abnormality check unit 58 checks whether the second output shaft signal Sg2 is larger than the normal lower limit value TH1 and smaller than the normal upper limit value TH2. In case it is determined that the second output shaft signal Sg2 is within the normal range (S304: YES), the process proceeds to S306. In case it is determined that the second output shaft signal Sg2 is outside the normal range (S304: NO), the process proceeds to S305. In S305, the abnormality check unit 58 sets both of the abnormality flags X_err1 and X_err2. In S306, the abnormality check unit 58 sets the first abnormality flag X_err1 and resets the second abnormality flag X_err2.

Returning to FIG. 4, in S109, which is executed following the abnormality check process of S300, the notification unit 59 checks whether at least one of the abnormality flags X_err1 and X_err2 is set. In case it is determined that the abnormality flags X_err1 and X_err2 are both not set (S109: NO), the process proceeds to S400. In case it is determined that at least one of the abnormality flags X_err1 and X_err2 is set (S109: YES), the process proceeds to S110. In S110, the notification unit 59 warns the user that an abnormality has occurred in the shift-by-wire system 1.

Figure 7:
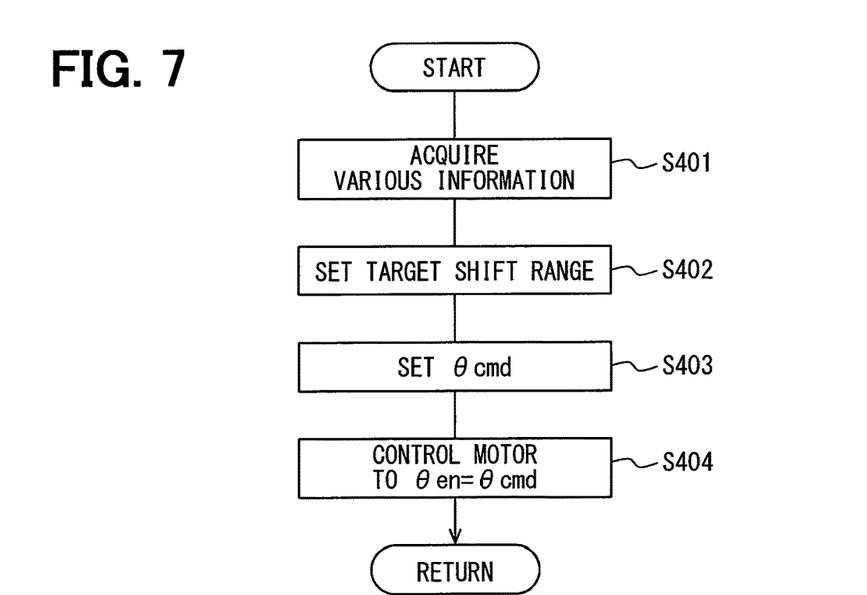
FIG. 7 is a flowchart showing a normal state time motor control process according to the embodiment.

In S400, the motor control in the normal state time is performed. A flowchart of the normal state time motor control process is shown in FIG. 7. In S401, the target setting unit 55 acquires the driver-requested shift range, which is input from the shift switch or the like, the vehicle speed, the brake signal and the like. In S402, the target setting unit 55 sets the target shift range based on the driver-requested shift range, the vehicle speed, the brake signal and the like.

In S403, the target setting unit 55 sets the target count value θcmd according to the target shift range by using the equations (2) to (5). Alternatively, the center count values θp, θr, θn and θd may be calculated and stored in the first storage unit 61 or the like in advance after calculation of the normal state time rattle width learning value θga, and the stored values may be retrieved later. In S404, the drive control unit 56 controls the driving of the motor 10 such that the encoder count value θen stops changing at the target count value θcmd.

Returning to FIG. 4, the ECU 50 checks in S112 whether the start switch has been turned off. In case it is determined that the start switch has not been turned off (S112: NO), the process returns to S300. In case it is determined that the start switch has been turned off (S112: YES), the present control is terminated.

In the present embodiment, the normal state time learning process and the abnormal state time learning process are executed as initial learning when the start switch is turned on. The reference angles θenL and θenR learned in the normal state time learning process are stored in the first storage unit 61, and the normal state time rattle width learning value θga is stored in the second storage unit 62. Driving of the motor 10 is controlled based on the first reference angle θenL and the normal state time rattle width learning value θga. The first reference angle θenL stored in the first storage unit 61 is maintained while the start switch is kept turned on. Therefore, even if an abnormality in which the output shaft signals Sg1 and Sg2 become unavailable to be used occurs while the start switch is ON, the motor 10 is controlled continuously by using the first reference angle θenL and the normal state time rattle width learning value θga, which have already been learned. Therefore, in the present embodiment, even if both of the output shaft signals Sg1 and Sg2 become abnormal, switching to the wall contact control is not performed while the start switch is kept ON.

In addition, when the start switch is turned off, the encoder 13 is reset and the first reference angle θenL is erased. As a result, it is not possible to use the normal state time rattle width learning value θga even when the normal state time rattle width learning value θga is held in the second storage unit 62. Therefore, in the present embodiment, in case that both of the abnormality flags X_err1 and X_err2 are set and the output axis signals Sg1 and Sg2 is unavailable to be used at the time when the start switch is turned on, the abnormal state time rattle width learning value θgb is learned in the abnormal state time learning process. Thus, even if both of the output shaft signals Sg1 and Sg2 are unavailable to be used because of, for example, a failure of the output shaft sensor 16, the switching control of the shift range can be continued and the vehicle can be driven in a limp-home mode.

As described above, the shift range control device according to the present embodiment switches the shift range by controlling the driving of the motor 10, and includes the angle calculation unit 51, the signal acquisition unit 52, the learning unit 53, the storage units 61, 62, the target setting unit 55, the drive control unit 56 and the abnormality check unit 58.

The angle calculation unit 51 acquires the motor rotation angle signal SgE output from the encoder 13 that detects the rotation position of the motor 10, and calculates the encoder count value θen. The signal acquisition unit 52 acquires the output shaft signals Sg1 and Sg2, which are output from the output shaft sensor 16 for detecting the rotation position of the output shaft 15 to which the rotation of the motor 10 is transmitted, and the values of which change in steps in accordance with the rotation position of the output shaft 15.

The learning unit 53 learns the position correction value used to calculate the motor angle target value. In the present embodiment, the normal state time rattle width learning value θga and the abnormal state time rattle width learning value θgb correspond to the position correction value. The first reference angle θenL is also used to calculate the target count value θcmd. In this sense, the first reference angle θenL itself may also be considered to be included in the concept of the position correction value. The storage units 61 and 62 store the normal state time rattle width learning value θga and the abnormal state time rattle width learning value θgb.

The target setting unit 55 sets the target count value θcmd according to the target shift range by using the normal state time rattle width learning value θga or the abnormal state time rattle width learning value θgb. The drive control unit 56 controls the driving of the motor 10 such that the encoder count value θen attains the target count value θcmd. The abnormality check unit 58 checks whether the output shaft signals Sg1 and Sg2 are available to be used.

When at least one of the output shaft signals Sg1 and Sg2 is available at the time of turning on the start switch, the learning unit 53 learns the normal state time rattle width learning value θga as the position correction value based on at least one of the first reference angle θenL and the second reference angle θenR. The first reference angle θenL is the encoder count value θen at the time of changes of the output shaft signals Sg1 and Sg2 when the motor 10 is rotated in the first direction. The second reference angle θenR is the encoder count value θen at the time of changes of the output shaft signals Sg1 and Sg2 when the motor 10 is rotated in the second direction opposite to the first direction. In addition, the target setting unit 55 sets the target count value θcmd by using the normal state time rattle width learning value θga stored in the second storage unit 62 during the period from when all the output shaft signals Sg1 and Sg2 are determined to be unavailable to be used until when the start switch is turned off.

The output shaft signals Sg1 and Sg2 are signals that change in steps according to the rotation position of the output shaft 15, and the rattle width θg is learned based on at least one of the reference angles θenL and θenR that is the encoder count value θen at the timing when the output shaft signals Sg1 and Sg2 change. Further, by setting the target count value θcmd based on the learning values θga and θgb that have been learned, the motor 10 can be controlled to be positioned in the center of the valley sections 221 to 224 with high accuracy even when the motor shaft 105 is located anywhere in the rattle range at the time of starting to drive the motor 10. Thereby, the detent roller 26 can be surely fitted in the valley sections 221 to 224 according to the target shift range.

In addition, even when the output shaft signals Sg1 and Sg2 become not unavailable to be used, the driving of the motor 10 is controlled by continuing the setting of the target count value θcmd, which uses the normal state time rattle width learning value θga without shifting to the wall contact control during the period while the start switch is being turned on. Thus, even when the abnormality occurs in the output shaft signals Sg1 and Sg2, the driving of the motor 10 can be properly continued. Further, when the output shaft signals Sg1 and Sg2 become unavailable to be used, the stress applied to the shift range switching mechanism 20 can be reduced as compared with the case where the control is shifted to the wall contact control promptly.

When all the output shaft signals Sg1 and Sg2 are unavailable to be used when the start switch is turned on, the learning unit 53 learns as the position correction value the abnormal state time rattle width learning value θgb calculated based on the encoder count value θen output when the motor 10 is rotated to the limit position of the movable range. As a result, even when all the output shaft signals Sg1 and Sg2 become unavailable, the switching control of the shift range can be continued by learning the rattle width θg by the wall contact control. It is thus possible to secure the limp-home running of the vehicle.

The output shaft 15 rotates integrally with the detent plate 21, which has the valley sections 221 to 224 in which the detent roller 26 is fit according to the shift range and the ridge sections 226 to 228 provided between the valley sections 221 to 224. The output shaft signals Sg1 and Sg2 change stepwise to take different values between before and after the movement when the detent roller 26 moves between the adjacent valley sections 221 to 224. Thereby, the rotation position of the output shaft 15 according to the shift range can be detected appropriately.

The first direction is the rotational direction of the rotating member at the time of switching from the P-range to the range other than the P-range. It is assumed that the valley sections on the P-range side of the ridge sections 226 to 228 are the P-range side valley sections, and the valley sections on the opposite side of the P-range are the counter P-range valley sections. The values of the output shaft signals Sg1 and Sg2 change at least at one location when the detent roller 26 is at the predetermined position between the center of the P-range side valley section and the top of the ridge section. In the present embodiment, the output shaft signals Sg1 and Sg2 change the values when the detent roller 26 is between the center of the first valley section 221 which is the P-range side valley section of the first ridge section 226 and the top of the first ridge section 226. The first reference angle θenL is the encoder count value θen at the time when the values of the output shaft signals Sg1 and Sg2 change during the movement of the detent roller 26 from the center of the first valley section 221 toward the top of the first ridge section 226.

The values of the output shaft signals Sg1 and Sg2 change at least at one location when the detent roller 26 is at the predetermined position between the center of the counter P-range side valley section and the top of the ridge section. In the present embodiment, the output shaft signals Sg1 and Sg2 change the values when the detent roller 26 is between the center of the fourth valley section 224 which is the counter P-range side valley section of the third ridge section 228 and the top of the third ridge section 228. The second reference angle θenR is the encoder count value θen at the time when the values of the output shaft signals Sg1 and Sg2 change during the movement of the detent roller 26 from the center of the fourth valley section 224 toward the top of the third ridge section 228.

When the rotation direction of the detent plate 21 is the first direction and the detent roller 26 is between the center of the first valley section 221 and the top of the first ridge section 226, the motor shaft 105 and the output shaft 15 are integrally rotated with the detent roller 26 pushed in the direction of movement. When the rotation direction of the detent plate 21 is the second direction and the detent roller 26 is between the center of the fourth valley section 224 and the top of the third ridge section 228, the motor shaft 105 and the output shaft 15 are integrally rotated with the detent roller 26 pushed in the direction of movement. Therefore, by using the encoder count value θen when the motor shaft 105 and the output shaft 15 rotate integrally, it is possible to learn the rattle width θg appropriately.

The shift range control device 40 has the notification unit 59 that warns that the shift-by-wire system 1 is abnormal when it is determined that at least one of the output shaft signals Sg1 and Sg2 is not available to be used. As a result, it is possible to appropriately notify the user that the shift-by-wire system 1 is abnormal, and to encourage the user to perform an early repair.

Other Embodiment

In the above embodiment, the learning unit learns the rattle width based on the first reference angle and the second reference angle in the normal state time learning process. As another embodiment, learning of the first reference angle or the second reference angle may be omitted by using a design value, for example. In the above embodiment, the first reference angle is learned when switching from the P-range to the range other than the P-range. As another embodiment, the value of the output shaft signal may be changed when the detent roller 26 is between the center of the second valley section 222 and the top of the second ridge section 227, and the motor angle at the change time, at which the shift range is switched from the R range to the N-range or the D-range, may be set as the first reference angle. Further, the value of the output shaft signal may be changed when the detent roller 26 is between the center of the third valley section 223 and the top of the third ridge section 228, and the motor angle at the change time, at which the shift range is switched from the N-range to the D-range, may be set as the first reference angle.

In the above embodiment, the second reference angle is learned when switching from the D-range to the range other than the D-range. As another embodiment, the value of the output shaft signal may be changed when the detent roller 26 is between the third valley section 223 and the top of the second ridge section 227, and the motor angle at the change time, at which the shift range is switched from the N-range to the R range or the P-range, may be set as the second reference angle. Further, the value of the output shaft signal may be changed when the detent roller 26 is between the second valley section 222 and the top of the first ridge section 226, and the motor angle at the change time, at which the shift range is switched from the R range to the P-range, may be set as the second reference angle. As another embodiment, the output shaft signal may be changed between the centers of the plurality of P-range side valley sections and the top of the ridge sections. In addition, the output shaft signal may be changed between the centers of the plurality of counter P-range side valley sections and the top of the ridge sections.

In the above embodiment, the angle θ1 at which the output shaft signal changes is set in the same manner as the P lock guarantee range. As another embodiment, the angle θ1 at which the output shaft signal changes may be different from the P lock guarantee range. Further, the angle θ1 at which the output shaft signal changes is set in the same manner as the D hydraulic pressure guarantee range. As another embodiment, the angle θ3 at which the output shaft signal changes may be different from the D lock hydraulic pressure guarantee range.

In the above embodiment, the learning of the second reference angle and the normal state time rattle width learning value is performed when the normal state time rattle width learning value is not stored in the storage unit and when the number of times the start switch is turned on or off from the previous learning. As another embodiment, the number of times of learning of the second reference angle and the normal state time rattle width learning value is not limited to the number described above, and may be executed each time the start switch is turned on as in the first reference angle.

In the above embodiment, the position correction value is the normal state time rattle width learning value, which is the value corresponding to the total of the plays between the motor shaft and the output shaft, and the abnormal state time rattle width learning value. As another embodiment, the correction value may be any value capable of computing the rattle width. It may be, for example, a value which corresponds to a distance from a center of rattle to an end position of the rattle, that is, θga/2, θgb/2 or the like. Further, the position correction value may be the first reference angle itself and the second reference angle itself. For example, if the output shaft signal is normal, the first reference angle is used as the position correction value, and the motor angle target value may be set based on the first reference angle and the angle between the change point where the output shaft signal changes and the valley section corresponding to the target shift range. The motor angle target value may be calculated by an arithmetic equation corresponding to the position correction value.

In the above embodiment, the motor is the DC brushless motor. As another embodiment, the motor may be any motor, such as a switched reluctance motor. In the above embodiment, although the number of winding sets of the motor is not referred to, the number of winding sets may be one or plural. In the above embodiment, the motor rotation angle sensor is the encoder. As another embodiment, the motor rotation angle sensor need not necessarily be the encoder but may be any other devices such as a resolver. That is, the motor angle is not limited to the encoder count value but may be any value that can be converted into the motor angle.

In the above embodiment, the MR sensor is used as the output shaft sensor. As another embodiment, a magnetic sensor other than the MR sensor may be used. Moreover, in the above embodiment, a double system is formed such that two independent output shaft signals are output from the output shaft sensor. As another embodiment, the number of output shaft signals output from the output shaft sensor may be one or three or more. That is, the output shaft sensor may be a single system type or a triple or more multiplex system type. The motor rotation angle sensor may be a multiple system.

In the above embodiment, the rotation member is the detent plate, and the engagement member is the detent roller. As another embodiment, the rotation member and the engagement member are not limited to the detent plate and the detent roller, but may be any other type in regard to a shape and the like. In the above embodiment, the detent plate is provided with four valley sections. As another embodiment, the number of the valley sections is not limited to four but may be any number. For example, the number of valley sections of the detent plate may be two so that the P-range and the notP-range may be switched. In the above embodiment, the number of engagement positions matches the number of steps of the output shaft signal. As another embodiment, the number of engagement positions and the number of steps of the output shaft signal may be different. For example, in the same ridge section, the values of the output shaft signal may be switched at the P-range side valley section side and the counter P-range valley section side. The shift range switching mechanism and the parking lock mechanism or the like may be different from the embodiment described above.

In the above embodiment, the speed reducer is placed between the motor shaft and the output shaft. Although the details of the speed reducer are not described in the embodiment described above, it may be configured by using, for example, a cycloid gear, a planetary gear, a spur gear that transmits torque from a reduction mechanism substantially coaxial with the motor shaft to a drive shaft, or any combination of these gears. As another embodiment, the speed reducer between the motor shaft and the output shaft may be omitted, or a mechanism other than the speed reducer may be provided. The present disclosure is not limited to the embodiment described above but various modifications may be made within the scope of the present disclosure without departing from the spirit of the disclosure.

The present disclosure has been made in accordance with the embodiment. However, the present disclosure is not limited to such an embodiment and configuration. That is, the present disclosure also encompasses various modifications and variations within the scope of equivalents. Furthermore, various combination and formation, and other combination and formation including one, more than one or less than one element may be made in the present disclosure.

The invention claimed is:

1. A shift range control device for switching a shift range by controlling driving of a motor, the shift range control device comprising:
    an angle calculation unit configured to acquire a motor rotation angle signal outputted from a motor rotation angle sensor, which detects a rotation position of the motor, and calculate a motor angle;
    a signal acquisition unit configured to acquire output shaft signals, which are output from an output shaft sensor for detecting a rotation position of an output shaft to which rotation of the motor is transmitted, values of the output shaft signals changing in steps in accordance with the rotation position of the output shaft;
    a learning unit configured to learn a position correction value, which is used to calculate a motor angle target value;
    a storage unit configured to store the position correction value;
    a target setting unit configured to set the motor angle target value according to a target shift range by using the position correction value;
    a drive control unit configured to control the driving of the motor such that the motor angle becomes the motor angle target value;
    an abnormality check unit configured to check whether the output shaft signals are available to be used, wherein
    the learning unit is configured to learn, as the position correction value, a normal state time correction value calculated based on at least one of a first reference angle and a second reference angle when at least one of the output shaft signals is available to be used at time of turning on of a start switch, the first reference angle is the motor angle at time when the output shaft signal changes in response to the rotation of the motor in a first direction, and the second reference angle is the motor angle at time when the output shaft signal changes in response to the rotation of the motor in a second direction opposite to the first direction; and
    the target setting unit is configured to set the motor angle target value by using the normal state time correction value stored in the storage unit during a period from a time point at which all of the output shaft signals are determined to be unavailable to be used until a time point at which the start switch is turned off;
    the output shaft is rotatable integrally with a rotation member which is formed with a plurality of valley sections, to which an engagement member is engaged according to a shift range, and ridge sections provided between the valley sections;
    the output shaft signal changes stepwise so as to have different values between before and after movement when the engagement member moves to the valley section which is adjacent to the engagement member;
    assuming that the first direction is a rotation direction of the rotation member when switching from a P-range to a range other than the P-range and the valley section at a P-range side of the ridge section is a P-range side valley section;
    the output shaft signals change values thereof at least at one position when the engagement member is at a predetermined position between a center of the P-range side valley section and a top of the ridge section; and
    the first reference angle is the motor angle at time of a change of the values of the output shaft signals when the engagement member moves from the center of the P-range side valley section toward the top of the ridge section.

2. The shift range control device according to claim 1, wherein:
    the learning unit is configured to learn, as the position correction value, an abnormal state time correction value calculated based on the motor angle at a time when the motor is rotated to a limit position of a movable range of the motor in case that all of the output shaft signals are unavailable to be used at the time of turning on of the start switch.

3. The shift range control device according to claim 1, wherein:
   assuming that the valley section which is opposite to the P-range side of the ridge section is a counter P-range side valley section,
   the output shaft signals changes values thereof at least at one position when the engagement member is at a predetermined position between a center of the counter P-range side valley section and a top of the ridge section; and
   the second reference angle is the motor angle at time of a change of the values of the output shaft signals when the engagement member moves from the center of the counter P-range side valley section toward the top of the ridge section.

4. The shift range control device according to claim 1, further comprising:
   a notification unit configured to warn that a shift range switching system is abnormal when it is determined that at least a part of the output shaft signals is unavailable to be used.

5. The shift range control device according to claim 1, wherein:
   the abnormality check unit is configured to determine that the output shaft signals, which are output from the output shaft sensor, are unavailable to be used when the output shaft signals are outside a normal range.

6. The shift range control device according to claim 1, wherein:
   the abnormality check unit is configured to
      determine that one of the output shaft signals is available to be used when the one of the output shaft signals is within a normal range; and
      determine that an other of the output shaft signals is unavailable to be used when the other of the output shaft signals is outside the normal range.

7. A shift range control device for switching a shift range by controlling driving of a motor, the shift range control device comprising a microcomputer configured to execute processes of:
   acquiring a motor rotation angle signal outputted from a motor rotation angle sensor, which detects a rotation position of the motor, and calculating a motor angle;
   acquiring output shaft signals, which are output from an output shaft sensor for detecting a rotation position of an output shaft to which rotation of the motor is transmitted, values of the output shaft signals changing in steps in accordance with the rotation position of the output shaft;
   learning a position correction value, which is used to calculate a motor angle target value;
   storing the position correction value;
   setting the motor angle target value according to a target shift range by using the position correction value;
   controlling the driving of the motor such that the motor angle becomes the motor angle target value;
   checking whether the output shaft signals are available to be used, wherein
   the process of learning learns, as the position correction value, a normal state time correction value calculated based on at least one of a first reference angle and a second reference angle when at least one of the output shaft signals is available to be used at time of turning on of a start switch, the first reference angle is the motor angle at time when the output shaft signal changes in response to the rotation of the motor in a first direction, and the second reference angle is the motor angle at time when the output shaft signal changes in response to the rotation of the motor in a second direction opposite to the first direction; and
   the process of setting sets the motor angle target value by using the normal state time correction value stored in a memory during a period from a time point at which all of the output shaft signals are determined to be unavailable to be used until a time point at which the start switch is turned off;
   the output shaft is rotatable integrally with a rotation member which is formed with a plurality of valley sections, to which an engagement member is engaged according to a shift range, and ridge sections provided between the valley sections;
   the output shaft signal changes stepwise so as to have different values between before and after movement when the engagement member moves to the valley section which is adjacent to the engagement member;
   assuming that the first direction is a rotation direction of the rotation member when switching from a P-range to a range other than the P-range and the valley section at a P-range side of the ridge section is a P-range side valley section;
   the output shaft signals change values thereof at least at one position when the engagement member is at a predetermined position between a center of the P-range side valley section and a top of the ridge section; and
   the first reference angle is the motor angle at time of a change of the values of the output shaft signals when the engagement member moves from the center of the P-range side valley section toward the top of the ridge section.

8. The shift range control device according to claim 7, wherein:
   the process of learning learns, as the position correction value, an abnormal state time correction value calculated based on the motor angle at a time when the motor is rotated to a limit position of a movable range of the motor in case that all of the output shaft signals are unavailable to be used at the time of turning on of the start switch.

9. The shift range control device according to claim 7, wherein:
   assuming that the valley section which is opposite to the P-range side of the ridge section is a counter P-range side valley section,
   the output shaft signals changes values thereof at least at one position when the engagement member is at a predetermined position between a center of the counter P-range side valley section and a top of the ridge section; and
   the second reference angle is the motor angle at time of a change of the values of the output shaft signals when the engagement member moves from the center of the counter P-range side valley section toward the top of the ridge section.

10. The shift range control device according to claim 7, wherein the microcomputer is configured further to execute a process of:
   warning that a shift range switching system is abnormal when it is determined that at least a part of the output shaft signals is unavailable to be used.

11. The shift range control device according to claim 7, wherein
the shift range control device is configured to further execute a process of:
determining that the output shaft signals, which are output from the output shaft sensor, are unavailable to be used when the output shaft signals are outside a normal range.

12. The shift range control device according to claim 7, wherein:
the shift range control device is configured to further execute a process of:
determining that one of the output shaft signals is available to be used when the one of the output shaft signals is within a normal range; and
determining that an other of the output shaft signals is unavailable to be used when the other of the output shaft signals is outside the normal range.

* * * * *